(12) United States Patent
Masuda et al.

(10) Patent No.: US 7,444,322 B2
(45) Date of Patent: Oct. 28, 2008

(54) ELECTRONIC MAIL DEVICE

(75) Inventors: Takahiro Masuda, Kawasaki (JP);
Yoshifusa Togawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 387 days.

(21) Appl. No.: 10/802,863

(22) Filed: Mar. 18, 2004

(65) Prior Publication Data
US 2004/0199500 A1 Oct. 7, 2004

(30) Foreign Application Priority Data
Apr. 30, 2003 (JP) ............................. 2003-125561

(51) Int. Cl.
*G06F 17/30* (2006.01)
(52) U.S. Cl. ........................... 707/3; 707/10; 707/104.1
(58) Field of Classification Search ................... 707/3, 707/10, 104.1; 709/206, 207
See application file for complete search history.

(56) References Cited

U.S. PATENT DOCUMENTS

| | | | | |
|---|---|---|---|---|
| 6,760,727 | B1 * | 7/2004 | Schroeder et al. ............. | 707/10 |
| 7,080,099 | B2 * | 7/2006 | Tada et al. ................ | 707/104.1 |
| 7,085,629 | B1 * | 8/2006 | Gotou et al. ................. | 709/203 |
| 7,370,079 | B2 * | 5/2008 | Murata et al. ................. | 707/10 |
| 2001/0034769 | A1 * | 10/2001 | Rast ........................... | 709/206 |
| 2002/0019849 | A1 * | 2/2002 | Tuvey et al. ................ | 709/206 |
| 2002/0044067 | A1 * | 4/2002 | Ilcisin ................... | 340/825.49 |
| 2003/0014389 | A1 * | 1/2003 | Hashimoto et al. ............. | 707/1 |
| 2004/0186848 | A1 * | 9/2004 | Kobashikawa et al. ...... | 707/102 |
| 2004/0196313 | A1 * | 10/2004 | Wynn et al. .................. | 345/779 |
| 2005/0165739 | A1 * | 7/2005 | Yamamoto et al. ............. | 707/3 |

FOREIGN PATENT DOCUMENTS

| | | |
|---|---|---|
| JP | 7-283834 | 10/1995 |
| JP | 10-107833 | 4/1998 |
| JP | 10-289173 | 10/1998 |
| JP | 11-53278 | 2/1999 |
| JP | 11-136278 | 5/1999 |
| JP | 11-296450 | 10/1999 |
| JP | 2000-163337 | 6/2000 |
| JP | 2000-250828 | 9/2000 |
| JP | 2000-322341 | 11/2000 |
| JP | 2001-5755 | 1/2001 |

OTHER PUBLICATIONS

Japanese Patent Office Action, mailed Apr. 15, 2008 and issued in corresponding Japanese Patent Application No. 2003-125561.

* cited by examiner

*Primary Examiner*—Shahid Al Alam
*Assistant Examiner*—Rezwanul Mahmood
(74) *Attorney, Agent, or Firm*—Staas & Halsey LLP

(57) ABSTRACT

To provide an electronic mail device, an information adding program for an electronic mail and an information adding method for an electronic mail that are capable of saving, when sending the electronic mail, a labor for transmitting the mail by automatically adding information related to a text that is to be transmitted. An input of an electronic mail created by a user is accepted, a keyword is acquired from the electronic mail, additional information corresponding to the keyword is searched for from an additional candidate storage unit stored with candidates for the additional information to the mail, etc. transmitted and received in the past, and the searched additional information is added to the electronic mail.

4 Claims, 15 Drawing Sheets

FIG. 4A

HOW IS EVERYBODY? ⏎
WE THINK WE WOULD LIKE TO HOLD A CLASS
REUNION AS BELOW. WE WISH ALL OF YOU
BE PRESENT. ⏎

```
ACCOUNT
```

81 — DATE/TIME:FEB. 20, FROM 7:00 P.M. ⏎
PLACE : CENTRAL PARK HOTEL ⏎ — 82
MEETING COST: 6000 YEN ⏎

FIG. 4B

HOW IS EVERYBODY?
WE THINK WE WOULD LIKE TO HOLD A CLASS
REUNION AS BELOW. WE WISH ALL OF YOU
BE PRESENT.

ACCOUNT

DATE/TIME: FEB. 20, FROM 7:00 P.M.
PLACE: CENTRAL PARK HOTEL

```
2 MINUTES BY WALK FROM SOUTH
ENTRANCE OF JR SHINJUKU STATION
TELEPHONE NUMBER 03-XXX-XXXX

SHINJUKU
```
83

MEETING COST:6000 YEN

FIG. 10

| KEYWORD | FILE NAME | FINAL DETERMINATION DATE | FREQUENCY |
|---|---|---|---|
| (^o^) | ~/sounds/se/joy.mp3 | 02/08/01 | 10 |
| SETAGAYA-WARD INHABITANT CENTER | ~/images/map/setagaya.jpg | 02/08/01 | 8 |
| EXHIBITION | ~/sounds/music/promenade.mp3 | 02/07/31 | 5 |
| | | | |
| | | | |

ELECTRONIC MAIL DEVICE

BACKGROUND OF THE INVENTION

The invention relates to a technology of automatically, when transmitting an electronic mail from on a personal computer or a cellular phone, adding additional information on the basis of a content of description of the electronic mail.

Nowadays, electronic mails become utilized broadly on mobile terminals such as cellular phones, a PDAs (personal digital assistants), etc. without being limited to personal computers.

The mobile terminal such as the cellular phone, the PDA, etc. has much restriction because of the priority being given to its portability and has problems, wherein a small-sized input device such as a keyboard, etc. is hard to input, the processing of an image file and a music file is too time-consuming due to a low throughput of an arithmetic processing unit.

It was therefore difficult to create and send a text attached with some sort of file on the cellular phone.

For instance, on the occasion of sending information about an appointment for meeting, a delivery of the mail attached with a map of a periphery of an appointment place for meeting requires a labor such as "search for map information→acquisition of map image information→attachment of image data" separately from creating a mail text purporting the appointment for meeting.

It is highly difficult to perform this by the cellular phone with its limited throughput and operability. Accordingly, in such a case, the explanation by mail was abandoned, other methods as by FAX, etc. had to be utilized.

Hence, there have been proposed a variety of methods and devices for adding the information to the electronic mail as below.

Patent document 1 proposes a system for selecting a necessary attachment text by executing a process such as a search, etc. for a database on the basis of information mainly about a sender and an appliance used as a terminal thereof or about a recipient and an appliance used as a terminal thereof.

Patent document 2 proposes an electronic mail device for transmitting, based on a transmitting date/time, a transmission area and a receipt area, a mail attached with pieces of information associated therewith.

Patent documents 3 and 4 propose a system and a method, wherein a sender describes tag-formatted setting information or the like, and an animation and a sentence corresponding to the setting information.

Patent document 5 proposes a system for extracting a location explicitly described in a mail text and attaching information (especially map information) about this location.

Patent documents 6 and 7 propose systems for accumulating pieces of information on parties to and from which mails were sent and received in the past, and attaching an adequate text suited to the accumulated information.

Patent document 8 proposes a system for judging whether a mail including an attachment text to be transmitted is pursuant to a predetermined format or not.

Patent document 9 proposes a system for retaining adequate mail format information adapted to a destination address and, when transmitting a mail, transmitting the mail on the basis of this piece of format information.

Non-Patent document 1 describes a service named "Mail with Premium" for attaching specified moving images, etc. to the mail on a cellular phone. This service is that the moving images, etc. serving as a premium is previously selected from a menu, and thereafter creating and sending a mail text to a destination party.

[Patent Document 1]
Japanese Patent Application Laid-Open Publication No.10-107833
[Patent Document 2]
Japanese Patent Application Laid-Open Publication No.2001-5755
[Patent Document 3]
Japanese Patent Application Laid-Open Publication No.2000-163337
[Patent Document 4]
Japanese Patent Application Laid-Open Publication No.2000-322341
[Patent Document 5]
Japanese Patent Application Laid-Open Publication No.11-53278
[Patent Document 6]
Japanese Patent Application Laid-Open Publication No.11-296450
[Patent Document 7]
Japanese Patent Application Laid-Open Publication No.11-136278
[Patent Document 8]
Japanese Patent Application Laid-Open Publication No.2000-250828
[Patent Document 9]
Japanese Patent Application Laid-Open Publication No.7-283834
[Non-Patent document 1]
Implementation of "Mail with Premium-Added Mail Campaign", example of "Premium-Added Mail", KDDI Corp., Okinawa Cellular Phone Inc., [Searched on Feb. 20th in 2003], Internet URL:http://www.kddi.com/release/2002/0605/index2.html

SUMMARY OF THE INVENTION

According to Patent documents 1 through 9 given above, the electronic mail is sent by attaching the related information on the basis of the predetermined information such as the time, the position, etc., and there are a small number of applicable cases because of being unable to extract unless these pieces of information are completely matched with each other.

Further, as in Non-Patent document 1, some of WWW servers provide a service for sending, after a user has selected an image, etc. beforehand, a mail attached with a simple text, however, the case of utilizing this service also requires a series of operations such as establishing a connection to the Internet and having attachable images displayed and selected, and it is therefore difficult for a terminal such as a cellular phone exhibiting a comparatively low throughput to perform these operations. Then, in this case, there arises a problem that a consistency between the selection of the file such as the image, etc. to be attached and the creation of the text is lost.

The invention was devised in view of the problems to the prior arts described above. Namely, the invention aims at providing an electronic mail device, an information adding program for an electronic mail and an information adding method for an electronic mail that scheme to save, when sending the electronic mail, a labor for transmitting the mail by automatically adding information related to a text that is to be transmitted.

The invention adopts the following means in order to solve the problems. Namely, in the electronic mail device, the information adding program for the electronic mail and the information adding method for the electronic mail according to the invention, an input of an electronic mail created by a user is accepted, a keyword is acquired from the electronic mail, additional information corresponding to the keyword is searched for from an additional candidate storage unit stored with candidates for the additional information to the mail, etc. transmitted and received in the past, and the searched additional information is added to the electronic mail.

Further, in the invention, when acquiring a keyword, information about an existing area of a sender or about a pre-registered recipient may be extracted as the keyword.

Moreover, in the invention, when acquiring a keyword, a date and time recorded in relative time since a date and time of transmission, an absolute date and time obtained from the present date and time, or the present date and time, may be extracted as the keyword.

Still further, in the invention, when searching for the additional information, in a case where plural pieces of additional information have been searched for, there may be accepted a selection of the information, which is actually added, from the plural pieces of additional information.

DESCRIPTION OF THE DRAWINGS

FIG. 4A,4B is an explanatory diagram of a keyword acquisition method.

FIG. 10 is a diagram showing an example of an additional information database.

DETAILED DESCRIPTION OF THE INVENTION

An electronic mail system will hereinafter be described by way of an embodiment of the invention with reference to the accompanying drawings.

Embodiment 1

§1. Device Architecture

Figure 1:
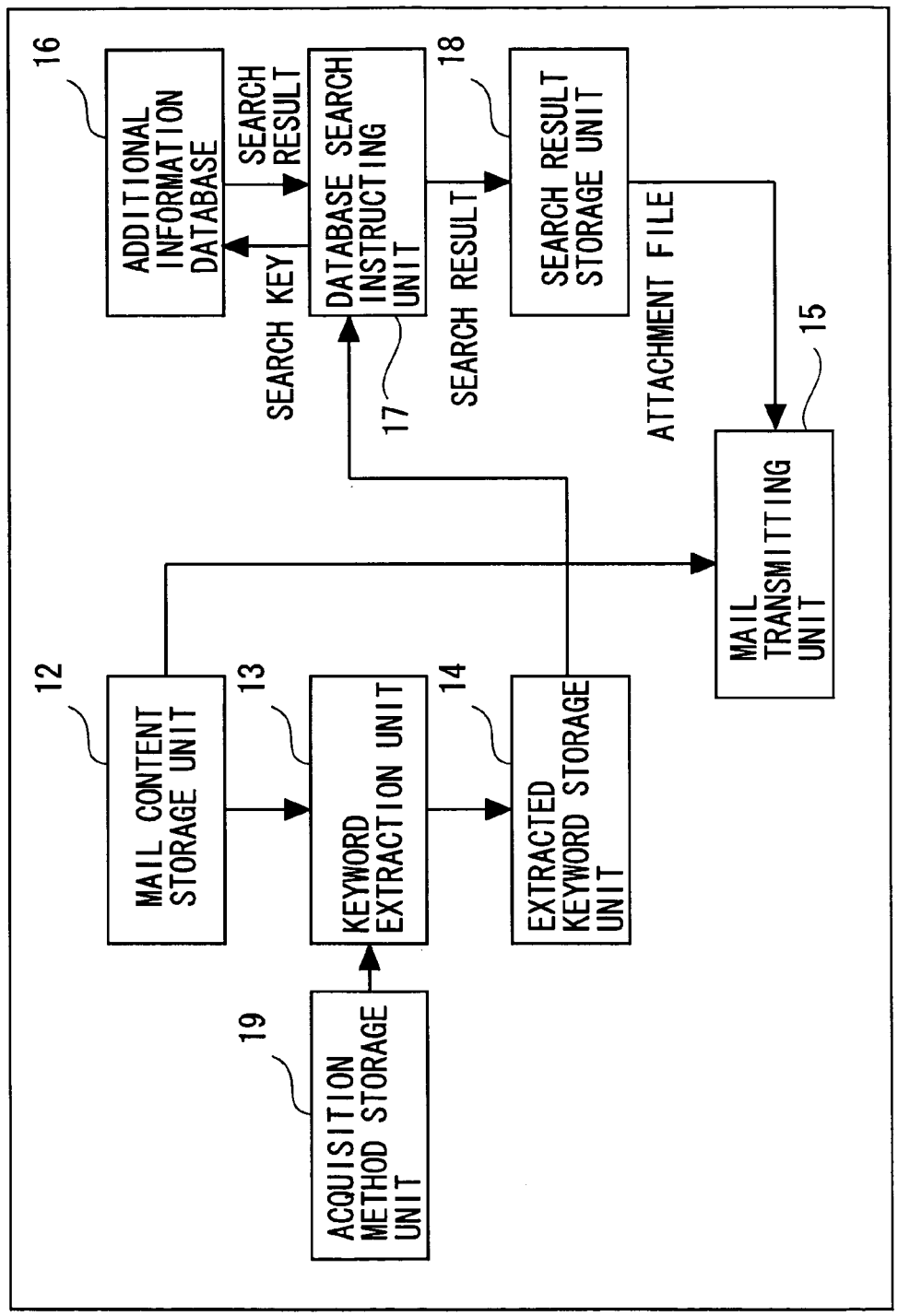
FIG. 1 is a block diagram of an electronic mail device by way of one embodiment of the invention.

FIG. 1 is a block diagram of an electronic mail device as one embodiment of the invention.

As shown in the same Figure, an electronic mail device 1 includes a mail content storage unit (corresponding to a mail accepting unit) 12, a keyword extraction unit 13, an extracted keyword storage unit 14, a mail transmitting unit (corresponding to an adding unit) 15, an additional information database 16, a database search instructing unit (corresponding to a search unit) 17, a search result storage unit 18, and an acquisition method storage unit 19.

The mail content storage unit 12 receives (accepts) an input of a processing-object electronic mail created by a user and stores this mail.

The keyword extraction unit 13 extracts a keyword from the electronic mail stored on the mail content storage unit 12.

The extracted keyword storage unit 14 temporarily stores the keyword extracted by the keyword extraction unit 13.

The mail transmitting unit 15 adds additional information searched for by the database search instructing unit 17 to the electronic mail and transmits this mail.

The additional information database 16 is stored with images and candidates for the additional information of the mails, etc., which were processed (e.g., transmitted and received) in the past.

The database search instructing unit 17 searches the additional information database 16 for the additional information corresponding to the keyword extracted by the keyword extraction unit 13.

The search result storage unit 18 temporarily stores the additional information searched for by the database search instructing unit 17.

The acquisition method storage unit 19 is stored with a keyword acquisition method when extracting the keyword by the keyword extraction unit 13.

The electronic mail device 1 may be a dedicated electronic appliance constructed of dedicatedly designed electronic circuits (hardware) as the respective units 12 through 19 described above, and may also be a device in which functions of the respective units 12 through 19 are softwarewise actualized by a general-purpose computer.

Figure 2:
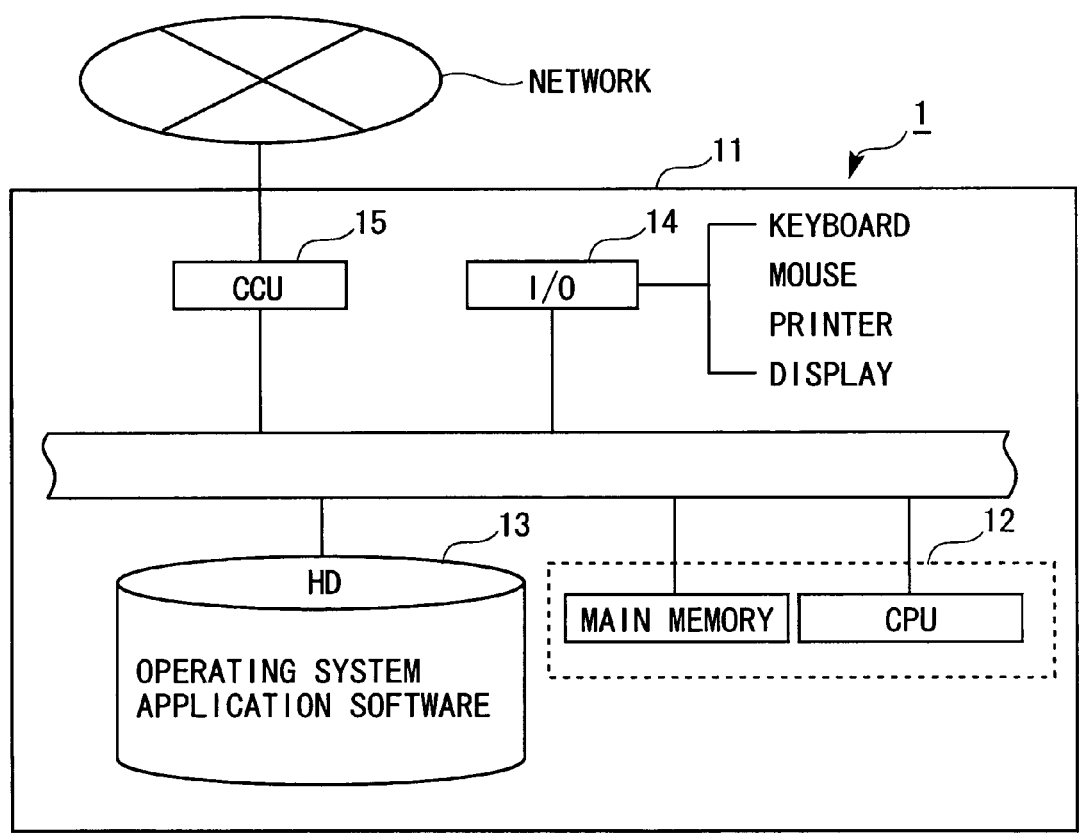
FIG. 2 is a schematic diagram of the electronic mail device.

FIG. 2 is an example of the case where a general type of computer actualizes the electronic mail device 1 in the embodiment.

As shown in the same Figure, the electronic mail device 1 includes, within a main body 61, an algebraic processing unit 62 constructed of a CPU (central processing unit), a main memory, etc., a storage device (hard disk) 63 stored with data and software for an algebraic process, an input/output (I/O) unit 64, and so on.

Connected properly to the I/O unit 64 are an input device such as a keyboard, a mouse, etc., an output device such as a display device, a printer, etc., and an interface for transmitting and receiving information with other appliances.

The storage device 63 is preinstalled with an operating system (OS) and application software (an information adding program for an electronic mail). Further, an interior of the storage device 63 is provided with the mail content storage unit (mail content storage area) 12, the acquisition method storage unit (acquisition method storage area) 19, and the additional information database 16.

The algebraic processing unit 62 executes the algebraic process based on the information adding program for the electronic mail, thereby functioning as the keyword extraction unit 13, the extracted keyword storage unit 14, the mail transmitting unit 15, the database search instructing unit 17 and the search result storage unit 18.

§2. Information Adding Method for Electronic Mail

Next, an electronic mail information adding method will be explained with reference to FIG. 3, by which the electronic mail device 1 executes the electronic mail information adding program, then adds additional information to the electronic mail and thus transmits the mail.

To begin with, a user inputs a content of transmission (a text to be transmitted) and a destination from on the keyboard of the electronic mail device 1, thus creating an electronic mail. The electronic mail device 1 accepts the input of this electronic mail and stores this mail on the mail content storage unit 12 (S1).

Next, the keyword extraction unit 13 reads a keyword acquisition method by referring to the acquisition method storage unit 19, then extracts a keyword from the electronic mail in the mail content storage unit 12 on the basis of this acquisition method (S2), and temporarily stores this keyword on the extracted keyword storage unit (the main memory) 14 (S3).

The database search instructing unit 17 searches the additional information database 16 by use of the extracted keyword, then retrieves a coincident piece of additional information from candidates for the additional information stored on the additional information database 16 (S4), and temporarily stores the additional information on the search result storage unit (the main memory) 18 (S5).

Then, the mail transmission unit 15 adds the searched additional information to the electronic mail stored on the mail content storage unit 12, and transmits this mail to the transmitting destination (S6). At this time, the additional information is added as a MIME-formatted or otherwise-formatted attachment file. Note that the additional information may be, in the case of its being text data, added to a mail text. Further, the electronic mail is created in a language such as HTML, etc., and the keyword and the additional information may be linked to each other so that the attachment file is displayed or reproduced upon clicking the keyword contained in the mail text.

§3. Keyword Acquisition Method

The keyword acquisition method in the embodiment is exemplified, for example, as follows.

The acquisition method storage unit 19 stores specified characters serving as a start point and an end point of the keyword and a layout thereof, the keyword extraction unit 13 searches the electronic mail created by the user for the start point and for the end point, and extracts, as a keyword, a character string delimited by the start point and the end point.

For instance, in an example in FIG. 4A, the keyword extraction unit 13, if the mail text contains a line where a character such as "account" singly appears and a character (a character string in Japanese) such as "place (ba sho)" posterior to this line, construes this as a start point 81 and construes a line containing this character place or a line element next thereto as a character string indicating some facility, then sets a next line feed to this character string as an end point 82, and extracts, as a keyword, the character string delimited by these points.

Then, the database search instructing unit 17, using "Central Park Hotel" as a keyword, searches the additional information database 16 for the additional information corresponding thereto.

FIG. 4B shows an example in which character strings such as "2 minutes by walk from the South entrance of JR Shinjuku station, telephone number: 03-XXXX-XXXX" and image information of a map are added as the additional information 83. Note that the map may be added as an attachment file without being displayed directly in the mail text. Further, the image may also be displayed in a way that sets a hyperlink between this attachment file and the keyword and clicks "Central Park Hotel".

Note that the keyword may be what does not necessarily have a meaning as a language but has a meaning as a form (pattern), etc. as shown in the following example.

For example, if a face mark (pattern) depicting a smile face like ":-)" is contained in the mail text, a file of joyful melodies are searched for and attached.

Moreover, if the mail text contains a pattern like "~~~~~~~~~~" which is visually associated with an image of waves, graphics of sea are searched for and attached.

As described above, according to the embodiment, the keyword is extracted from the text of the electronic mail, and the related information can be automatically added.

Accordingly, the mail user can save a labor for taking trouble to separately search the necessary file when transmitting the mail, and it is therefore feasible to provide the easier-to-use electronic mail device. Further, processes starting with searching a music file and an image file conforming to the mail text and ending with attaching them can be largely omitted, and hence the electronic mail device gaining a more capability of expression can be provided.

Embodiment 2

Figure 5:
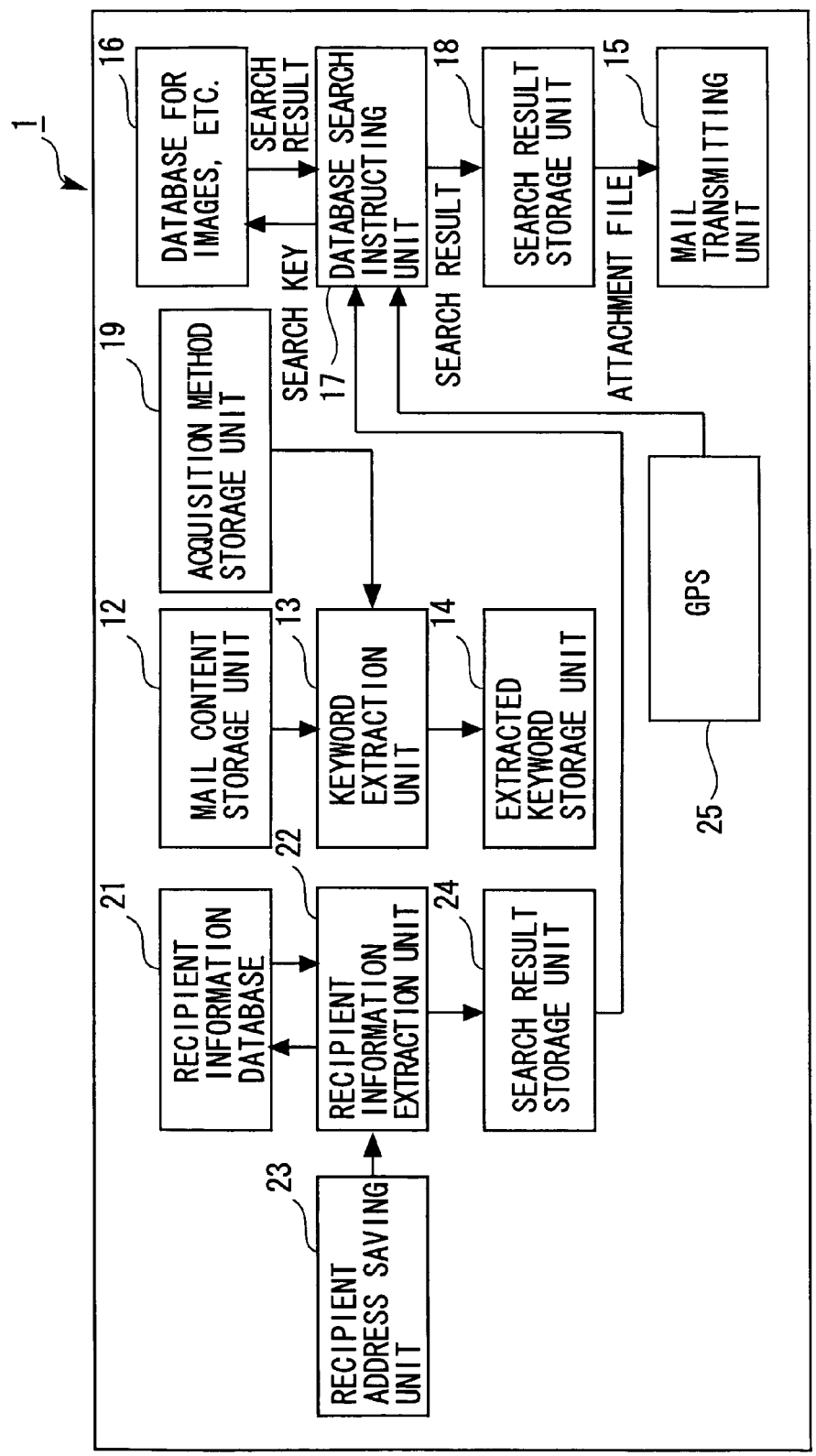
FIG. 5 is a block diagram of the electronic mail device in an embodiment 2.

FIG. 5 is a block diagram of an embodiment 2 according to the invention. A difference between this embodiment and the embodiment 1 is that the information about an existing area of a sender or the information about a pre-registered recipient is extracted as a keyword. Note that other architectures are substantially the same, and hence the same components are marked with the same numerals while their repetitive explanations are omitted.

As shown in FIG. 5, the electronic mail device 1 in the embodiment further includes a recipient information database 21, a recipient information extraction unit 22, a recipient address saving unit 23, a search result storage unit 24 and a GPS 25.

The recipient address saving unit 23 is a so-called address book for saving (storing) a mail address and a name of the recipient by mapping them to each other.

The recipient information database 21 is stored with pieces of information indicting a recipient address, the nearest station, a car owned or non-owned, etc. for every name (recipient name).

The recipient information extraction unit 22 acquires the recipient name associated with the mail address inputted to a destination address box in the electronic mail, and searches the recipient information database 21 for the information about this recipient name.

The search result storage unit 24 temporarily stores the information searched for by the recipient information extraction unit 22.

The GPS 25 obtains a present position, i.e., a position of the sender by receiving radio waves from a satellite via a GPS antenna connected to the I/O 64.

Note that both of the recipient information extraction unit 22 and the GPS 25 function as the keyword extraction unit in the embodiment.

The recipient information database 21, the recipient address saving unit 23, the search result storage unit 24 are included in the storage device 63. Further, the recipient information extraction unit 22 and the GPS 25 are actualized by the algebraic processing unit 62.

Figure 3:
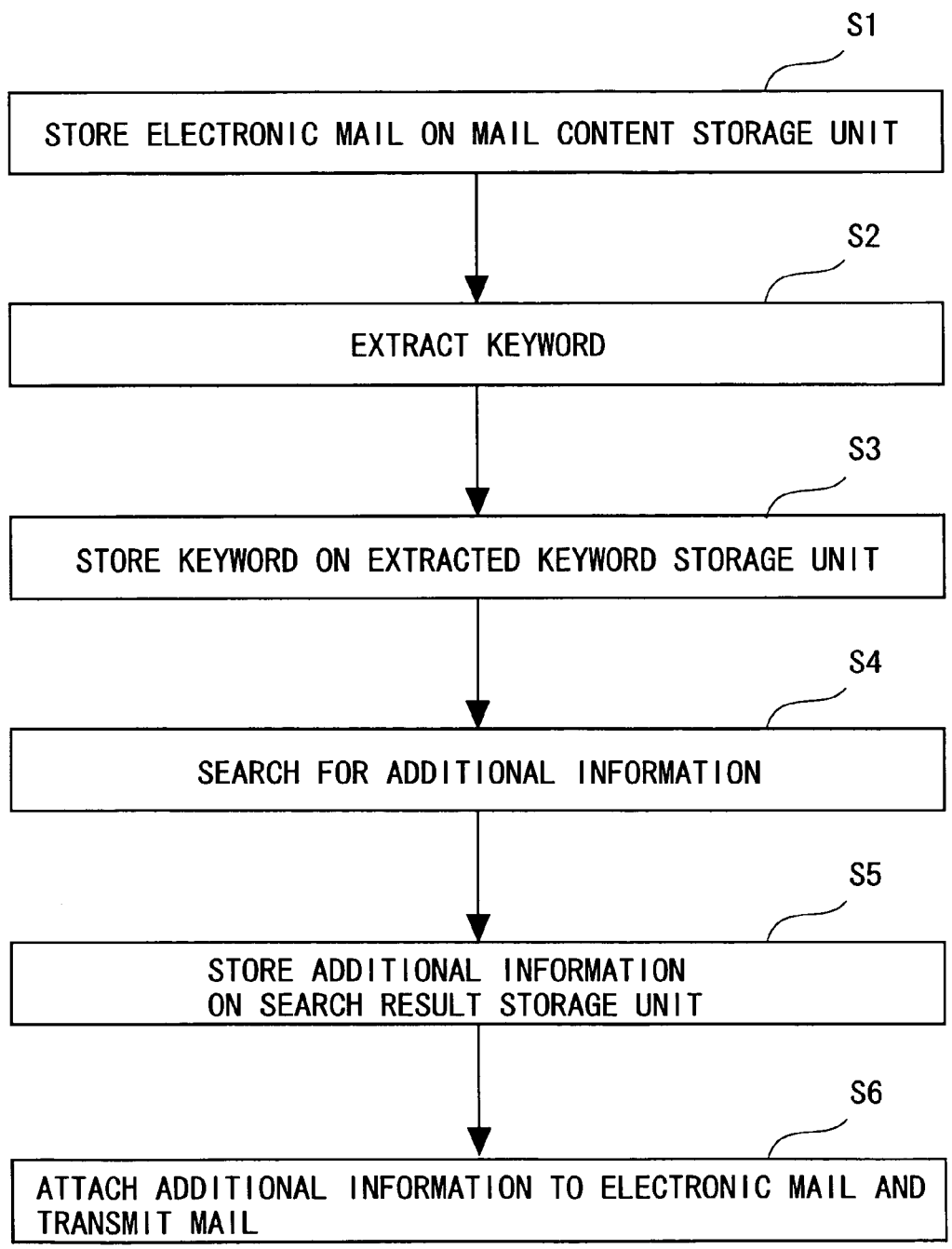
FIG. 3 is an explanatory diagram of an information adding method for an electronic mail.

The electronic mail device 1 extracts, as shown in FIG. 3, a keyword from the electronic mail, searches for additional information corresponding to this keyword, and adds it to the electronic mail. At this time, in the embodiment, in step 2 of extracting the keyword, the information about the existing area of the sender or the information about the pre-registered recipient is extracted as the keyword.

Figure 6:
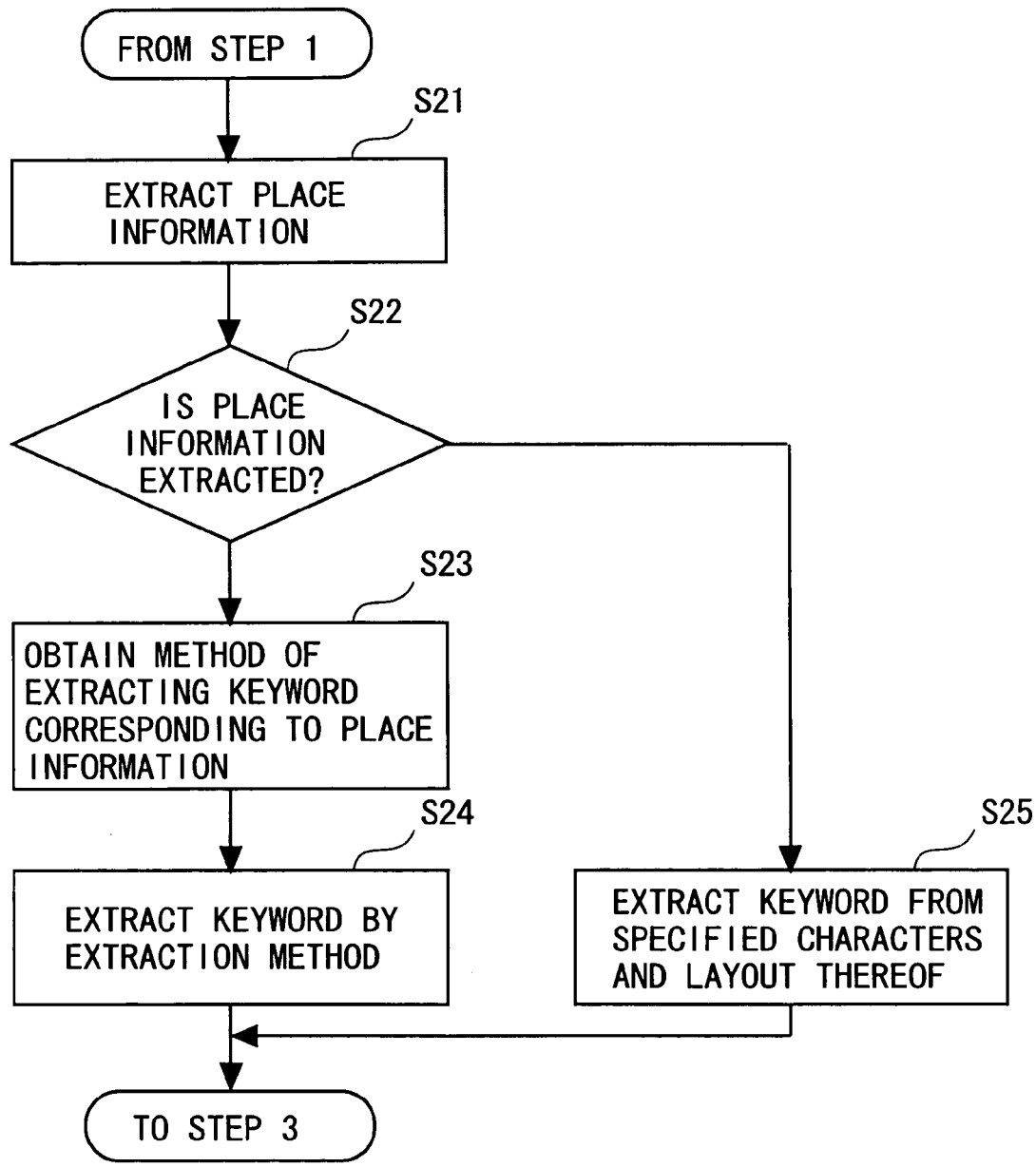
FIG. 6 is an explanatory diagram of a keyword extraction method in the embodiment 2.

This keyword extraction method will hereinafter be described with reference to FIG. 6.

As described above, when the electronic mail is stored on the mail content storage unit 12, the keyword extraction unit 13 extracts information (place information) pertaining to a place from the electronic mail (S21). This piece of place information is given such as "come down here", "pick me up", "a nice shop is found out", and so on.

In the case where the place information has been extracted, the keyword extraction unit 13 acquires a keyword extraction method corresponding to the place information by referring to the acquired method storage unit 19. For example, the acquisition method storage unit 19 is stored with mappings of the position information to the information to be extracted so that in the case where the place information is "pick me up", the position information of the sender, the address of the recipient and the car owned or non-owned are extracted as keywords, and, in the case where the place information is "a nice shop is found out", only the position information of the sender is extracted, and so forth (S22, S23).

Then, the keyword is extracted based on this extraction method. For example, in the case of obtaining the position information of the sender, the GPS 25 obtains the present position, i.e., the position of the sender on the basis of the radio waves. Further, in the case of obtaining the recipient information, the recipient information extraction unit 22 acquires the recipient name associated with the mail address inputted to the destination address box in the electronic mail by referring to the recipient address saving unit 23, and searches the recipient information database 21 for the information about this recipient name (S24).

On the other hand, if the position information is not extracted in step 22, the keyword extraction unit 13 extracts the keyword from the specified characters and its layout in the same way as the above-mentioned (S22, S25).

The electronic mail device 1 stores the search result storage unit 24 with these keywords, e.g., the position information of the sender and the recipient information (S3), the database search instructing unit 17 searches for the additional information (S4), and the processing is executed as described above from this onwards.

This being done, for example, when sending a mail saying "come down here", the position information of the sender is acquired by the GPS 25, a latitude and a longitude of the present position or a name of the facility existing in this position is used as a keyword for searching, and pieces of additional information such as a photo of an external appearance of the facility and information about the nearest station are acquired from the additional information database 16, and are transmitted as an attachment file.

In addition to the above, in the case of obtaining the information on the nearest station to the recipient from the recipient address, a shortest time route till a target station is reached from this station, is acquired from the additional information database 16 and transmitted as an attachment file.

As described above, according to the embodiment, the additional information on the position can be automatically added by use of the existing area of the sender or the information about the pre-registered recipient as the keyword.

Embodiment 3

Figure 7:
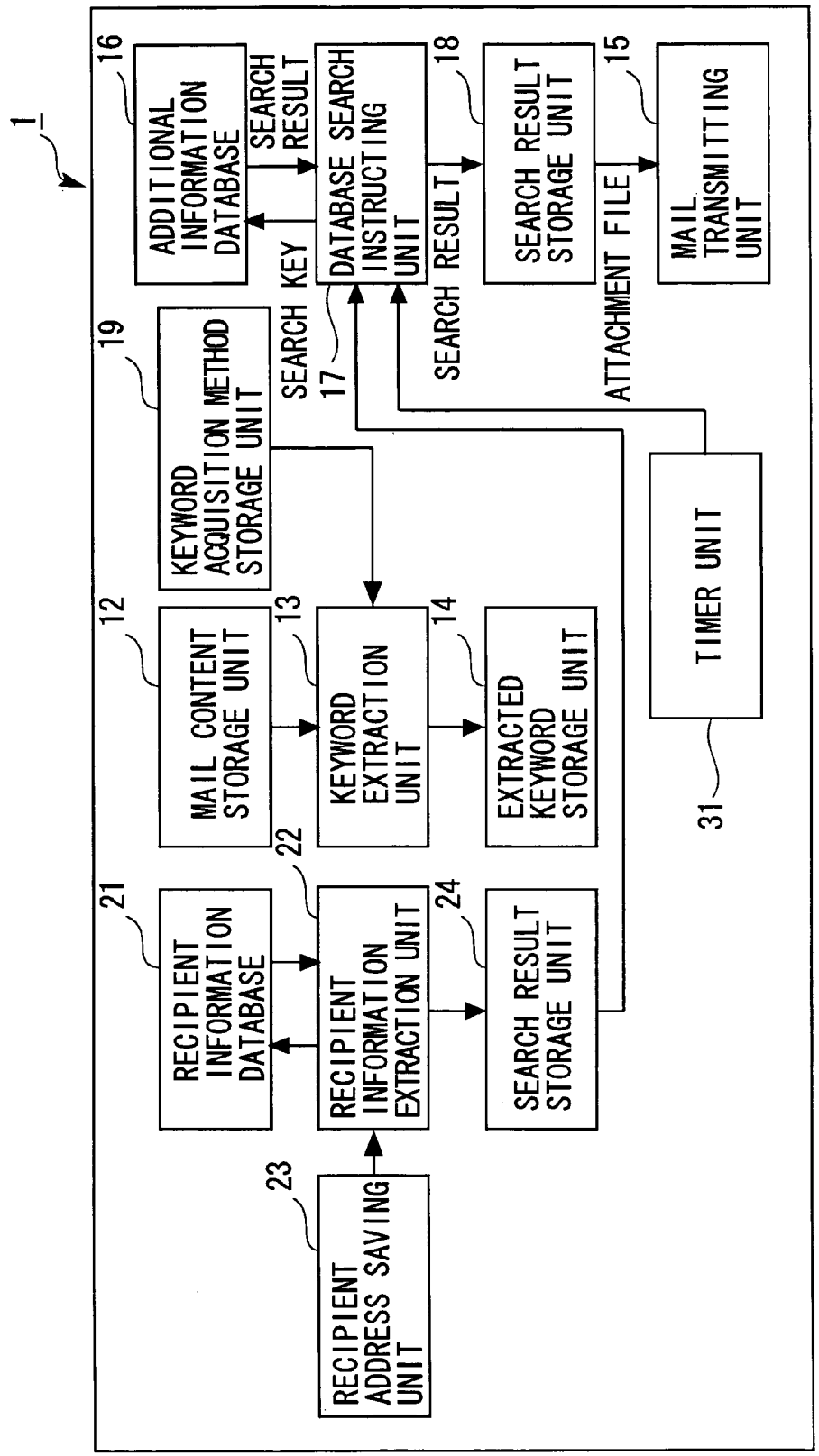
FIG. 7 is a block diagram of the electronic mail device in an embodiment 3.

FIG. 7 is a block diagram of an embodiment 3 according to the invention. This embodiment is different from the embodiment 2 in terms of a point of extracting information (time information) on the time. Note that other architectures are the substantially the same, and therefore the same components are marked with the same numerals while their repetitive explanations are omitted.

As illustrated in FIG. 7, the electronic mail device 1 in the embodiment has an architecture including a timer unit 31 as a substitute for the GPS 25 in FIG. 5. It is to be noted that these two components may co-exist as a matter of fact.

The timer unit 31 is actualized by an algebraic processing unit 62, and acquires the present time or TOD (time of day)

The electronic mail device 1 extracts the keyword from the electronic mail as shown in FIG. 3, searches for the additional information corresponding to this keyword, and adds it to the electronic mail. At this time, in the embodiment, in step 2 of extracting the keyword, a date/time recorded as a relative time since a transmission date/time, an absolute date/time obtained from the present date/time, or the present date/time is extracted as a keyword.

Figure 8:
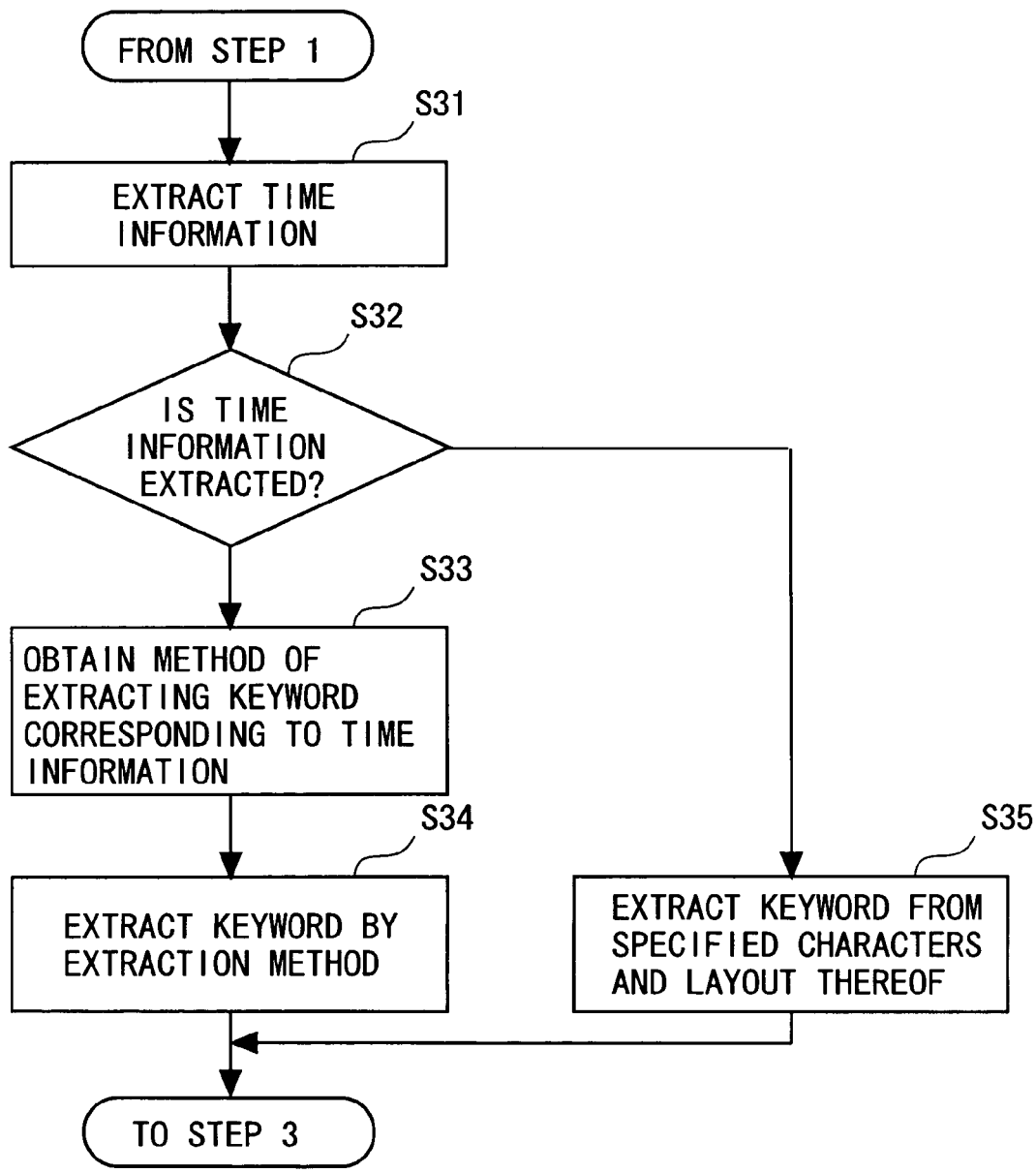
FIG. 8 is an explanatory diagram of the keyword extraction method in the embodiment 3.

This keyword extraction method will hereinafter be described with reference to FIG. 8.

As described above, when the mail content storage unit 12 is stored with the electronic mail, the keyword extraction unit 13 extracts the information (time information) relating to the place out of the electronic mail (S31). This piece of time information is exemplified such as "on Saturday next week . . . ", "after one hour.", "I'll go now.", etc.

In the case of the time information being extracted, the keyword extraction unit 13 acquires the keyword extraction method associated with the time information by referring to the acquisition method storage unit 19. For example, in the case where the time information is "on Saturday next week", a specific date of Saturday in the next week is obtained, and, in the case where the predicate of this sentence is "go together ?", the place information and the recipient information are acquired (S32, S33).

Then, the keyword is extracted based on this extraction method. For example, in the case where the present time is Feb. 12(Wednesday) in the year of 2003, Jan. 22(Saturday) in 2003 is acquired as a keyword.

Further, in the case where a content of the mail is "On Saturday next week, shall we go to the 000 Museum ?", from a phrase of "shall we go to . . . ?" in "shall we go to the 000 Museum ?" subsequent to the time information of "Saturday next week", it is recognized that the place information exists anterior thereto, and "the 000 Museum" is extracted as the place information.

Moreover, in the case of obtaining the recipient information, the recipient information extraction unit 22 acquires the recipient name associated with the mail address inputted to the destination address box in the electronic mail by referring to the recipient address saving unit 23, and searches the recipient information database 21 for a piece of information about this recipient name (S34).

While on the other hand, if this piece of time information is not extracted, the keyword extraction unit 13 extracts the specified characters and the keyword from the layout thereof in the same way as the above-mentioned (S32, S35).

The electronic mail device 1 stores the search result storage unit 24 with theses keywords such as the specific date, the place information and the recipient information (S3), makes the database search instructing unit 17 search for the additional information (S4), and executes the process as described above from this onwards.

This being done, when delivering a mail saying, for instance, "On Saturday next week, shall we go to the 000 Museum ?", the additional information database 16 is searched in a way that uses, as the keywords, date/time recorded in the relative time (which is a specific date corresponding to Saturday in the next week), the OOO Museum (the place information) and the nearest station to the recipient (the recipient information), whereby a content and information of the exhibition held at the OOO Museum at the above date/time and information about an access to the OOO Museum from the nearest station to the recipient are obtained and transmitted as an attachment file.

As described above, according to the embodiment, the time-related additional information can be automatically added by using, as the keyword, the date/time recorded in the relative time since the transmission date/time, the absolute date/time obtained from the present date/time, or the present date/time.

Embodiment 4

Figure 9:
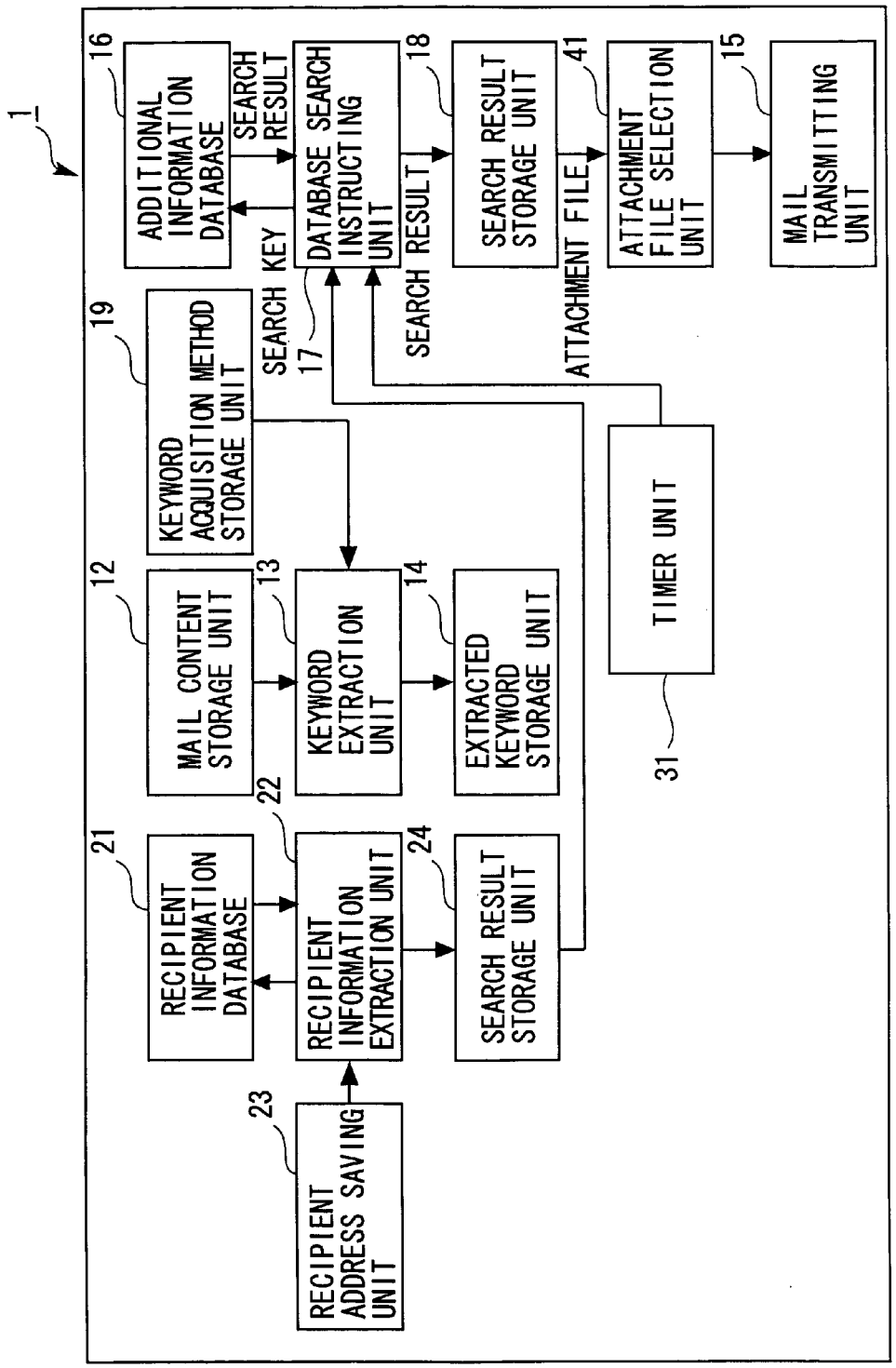
FIG. 9 is a block diagram of the electronic mail device in an embodiment 4.

FIG. 9 is a block diagram of an embodiment 4 according to the invention. This embodiment is different from the embodiment 3 in terms of a point of including an attachment file selection unit (corresponding to an additional information selection unit) for selecting a file that is actually attached in the case of having searched for a plurality of files (the additional information) to be attached. Note that other architectures are substantially the same, and hence the same components are marked with the same numerals while their repetitive explanations are omitted.

An attachment file selection unit 41, which is actualized by an algebraic processing unit 62, displays or reproduces plural pieces of additional information to prompt the user to make a selection, accepts the selection by the user, and notifies the mail transmitting unit 15 of information indicating which additional information has been selected.

The mail transmitting unit 15, based on this piece of information, adds the selected additional information to the electronic mail and transmits this mail.

Note that the attachment file selection unit 41 executes a process (preview) such as displaying first several tens of characters when the attachment file is a text file, displaying, when it is an image file, it by thinning out the number of colors and its size, and outputting only first several seconds of a voice file by thinning out a sampling rate when it is the voice file, thereby providing bases for the selection.

Moreover, the additional information database is stored with which file has actually been selected as the file that should be attached, when displaying a list of plural pieces of extracted additional information or reproducing them in sequence, the file exhibiting a larger selected count in the past may be positioned in a higher rank in the list of selection candidates, or they may be reproduced in an earlier sequence, whereby an easy-to-select scheme may be given.

FIG. 10 is an example of this additional information database, wherein a numeral inputted to a field of frequency is the selected count in the past.

This database may be shared among a group by installing the database onto the network so as to be utilizable by a plurality of users without being limited to the use on the individual terminals. In this case, if nothing is obtained by referring at first to the additional information database for the individual, the additional information database on the network shall be referred to.

When arbitrarily registering a record on this additional information database, this is done in the following procedures.

1. Select an arbitrary part of text or title of the mail.
2. Give an instruction of "new registration in database" with respect to the selected part.
3. Select an attachment file.

At this time, the selected part serves as a keyword to the database, and the selected attachment file serves as a file name. Further, a date/time when executing this process becomes a final determination date, wherein 1 is set in the frequency.

Hereafter, there continues a search of whether there is a part coincident with the keyword by use of the database.

The electronic mail device 1 extracts the keyword from the electronic mail as shown in FIG. 3, searches for the additional information corresponding to this keyword, and adds it to the electronic mail. At this time, in the embodiment, the user is presented the plurality of attachment files stored on the search result storage unit 18 and is prompted to make a selection thereof, and the selected file is actually attached.

Figure 11:
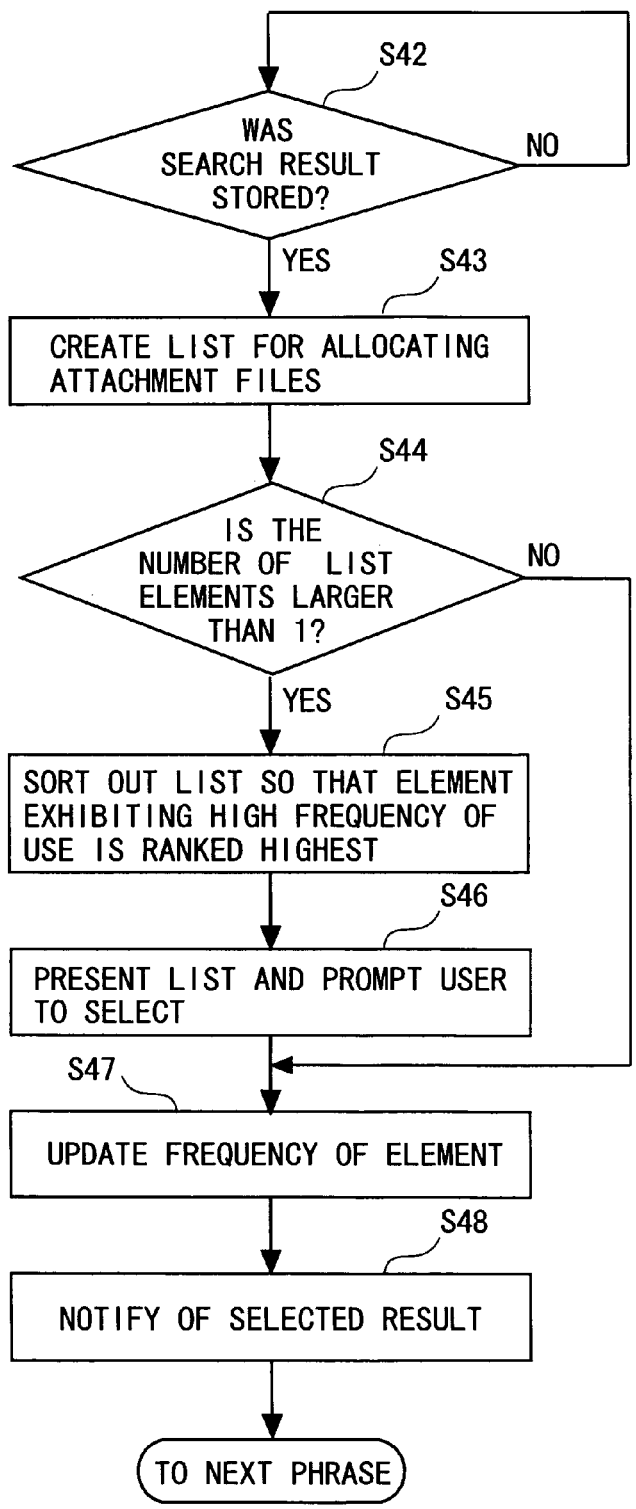
FIG. 11 is an explanatory diagram of procedures of selecting an attachment file.

The selection of this attachment file will hereinafter be described with reference to FIG. 11.

To start with, the attachment file selection unit 41 monitors whether or not the search result is stored on the search result storage unit 18 (S42), and, if the search result has been stored, creates a list of the attachment files on the basis of this search result (S43). If the number of elements of this list (the number of attachment files) is larger than 1, the list undergoes sorting in the sequence from the highest frequency (S44, S45).

Next, the attachment file selection unit 41 presents this list and prompts the user to make a selection by previewing the respective files (S46).

When the user makes this selection, the attachment file selection unit 41 accepts information (a result of the selection) indicating which attachment file has been selected, and updates the frequency of the attachment file on the basis of this selected result. For example, 1 is added to the frequency of the attachment file (S47).

Then, the attachment file selection unit 41 notifies the mail transmitting unit 51 of this selected result (S48).

After this selection has been effected for all the keywords, the mail transmitting unit 51 adds, based on the selected result, the selected attachment file and transmits the electronic mail (S6).

As described above, according to the embodiment, a necessary piece of additional information among e plural pieces of additional information searched for, is selected by the user and can added.

Embodiment 5

Figure 12:
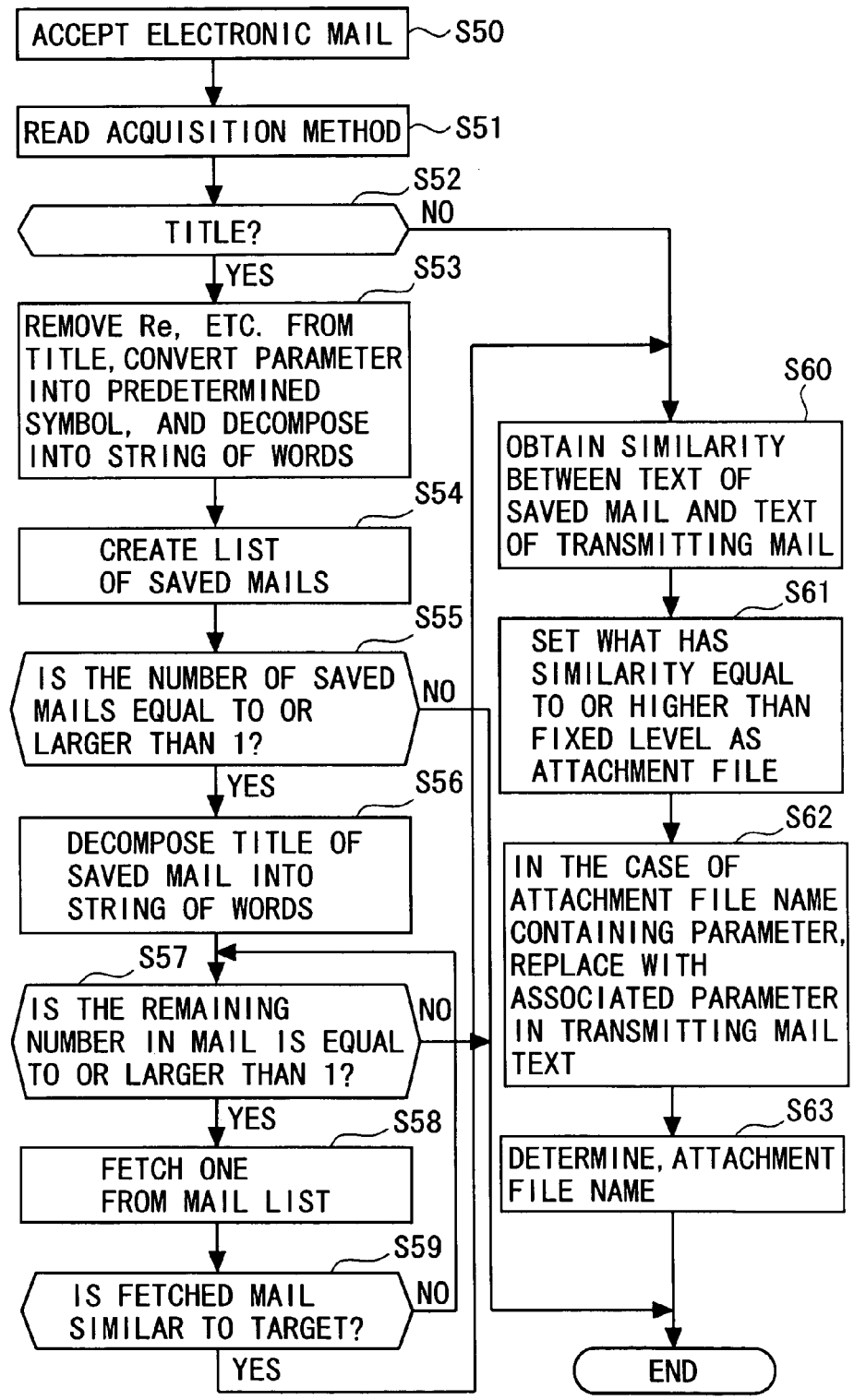
FIG. 12 is an explanatory diagram of procedures of determining the attachment file in an embodiment.

Next, another example of the attachment file determining procedures according to the invention will be shown. FIG. 12 is an explanatory diagram of the attachment file determining procedures in the embodiment. This embodiment is different from the embodiment 1 in terms of procedures of determining the file (additional information). Note that other architectures are substantially the same, and hence the same components are marked with the same numerals while their repetitive explanations are omitted.

The electronic mail device 1 in the embodiment determines, as shown in FIG. 12, the file that should be attached from the text and the tile of the mail created in the past.

To begin with, the user creates the electronic mail by inputting a content of transmission (a text to be transmitted) from on the keyboard of the electronic mail device 1. The electronic mail device 1 accepts an input of this electronic mail (which will hereinafter be also called a transmission mail) and stores the mail content storage unit 12 with this (S50).

The keyword extraction unit 13 reads the keyword acquisition method by referring to the acquisition method storage unit 19 (S51), and hereafter extracts the keyword on the basis of this acquisition method.

This keyword extraction unit 13 judges whether the transmission mail contains a title or not (S52), then, in a case where the title has already been given, removes words indicating a reply or forwarding (Re:, FW:, etc.) from this title, and, with respect to words indicating numerals or Chinese numerals (excluding those as a part of proper nouns), replaces these words with symbols indicating different parameters and thereafter decomposes them into a string of words (S53).

Next, the keyword extraction unit 13 creates a list of mails attached with some sort of files among the mails (which will hereinafter be referred to as saved mails) that have ever been transmitted or received (transmission or receipt) in the past and saved on the storage device 63 (S54). If the number of mails of this list is equal to or more than 1, the title is decomposed into a string of words in the same way as the above-mentioned (S55, S56).

Then, the string of words created from this saved mail is sequentially read out, then a similarity is evaluated by comparing with the string of words created from the transmission mail, and this is repeated till the similar string of words are detected (S57-S59).

What meets, for example, the following conditions shall be judged to be similar.
1. Both of the strings of words are perfectly coincident with each other.
2. Both of the strings of words are coincident forwards.
3. A value given by <<the number of words used in common throughout the respective titles>>/<<the total number of words>> is obtained, and this value is equal to or larger than a fixed level, e.g., 0.8.

If a mail exhibiting a high similarity is requested, the keyword extraction unit 13 obtains a similarity between the text of the saved mail and the text of the transmission mail (S60), then acquires a name of the file attached to the saved mail in a case where this similarity is equal to or higher than the fixed level, and sets this file as the attachment file to the mail that is to be transmitted this time (S61).

Figure 13:
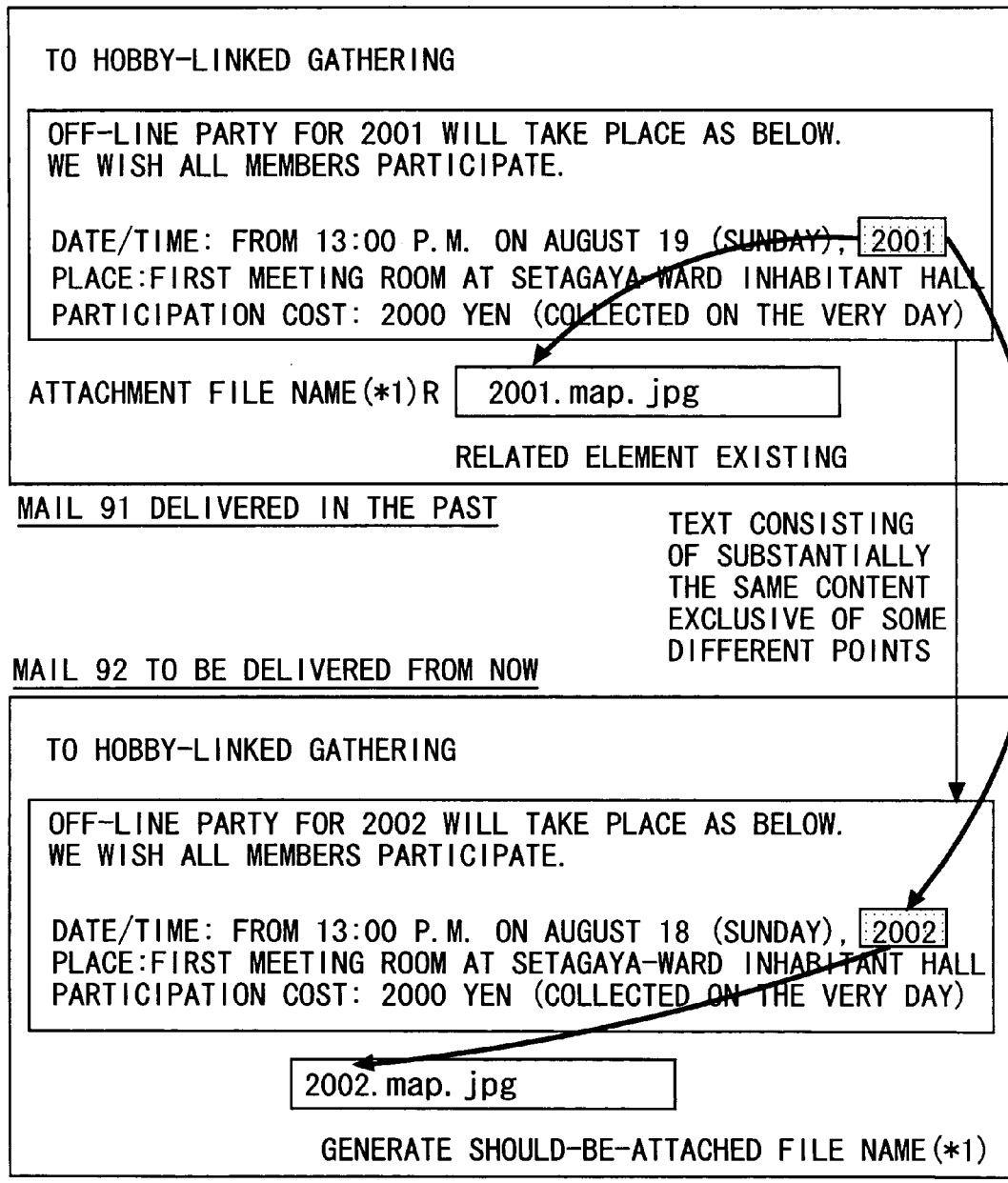
FIG. 13 is an explanatory diagram of procedure of determining a file name.

The keyword extraction unit 13 replaces, in a case where this file name contains parameters such as a year/month/day/hour/minute existing in the text or title, these elements are replaced with the equal values in the mail that is to be transmitted this time. If these values are the same as the transmission mail has, and if these values do not exist in the saved mail, there is no necessity of being replaced with, and the same attachment file is carried on as it is. For instance, as shown in FIG. 13, a saved mail 91 is attached with an attachment file having a file name containing a parameter "2001", and, if the parameter "2002" indicating a date exists in this text and if a parameter "2002" indicating a date exists in a text of a transmission mail 92, the file name is set such as 2002map.jpeg by replacing the parameter "2001" in the file name with "2002" (S62).

The keyword extraction unit 13 sets the thus acquired file name as a file name to be attached to the transmission mail that is to be transmitted this time (S63).

Note that in a case where a tile is not yet given to the transmission mail, this is done in a way that ignores the element in which the similarity of the title is sought from the above process.

Further, when making use of this procedure, it is desirable that the saved mails be sorted out in the sequence of the creation dates thereof, then obtained in sequence from the latest creating date and compared with the transmission mail.

Then, if none of the attachment files are obtained in these procedures, the keyword extraction unit 13 executes:

(1) a process of listing up and presenting the candidates among those existing, having a file name selected, and attaching its file content as it is;

(2) a process of listing up and presenting the candidates among those existing, having a file name selected, and attaching its file content after effecting an edit process thereof;

(3) a process of prompting the user to create a new file to be attached; and (4) a process of processing as an error such as giving an alarm to the user in a case where there is no relevant file, and, if there are subsequent processes, having a selection made as to whether it is a continuous execution or not.

The four processes exemplified above are previously given the priorities from the above, the user is queried about whether or not the process is applied from the highest priority, and the relevant process may be executed.

Further, a technique for judging the similarity between the text of the transmission mail and the text of the saved mail may involve using any types of known techniques.

For instance, an analysis is made based on keys such as whether or not there are words indicating a date and a time such as "year", "month", "day", "hour" and "minute", matching with a format showing a date such as "2002/08/02", etc., and whether or not there are words indicating a place such as "Tokyo", "Hokkaido", "Osaka or Kyoto", "Prefecture", "City", "Town", "Village", "Building", "Station", etc.

Moreover, a significance-attached keyword is extracted from the transmission mail and form the saved mail by use of a technology of "Extraction of Significance-Attached Keyword" (The Language Engineering Laboratory Inc., and, if a fixed or higher level of coincidence can be confirmed by quantitatively judging a degree of coincidence, this saved mail is processed as a similar mail.

Further, a topic structure of the transmission mail is analyzed by use of a text mining tool, the saved mails having the same topic structure are extracted, and the similarity of each of these mails is verified in greater detail by use of the keyword extraction method.

Note that a plurality of names of files that should be attached or of which contents should be taken in, can be made corresponding to one single keyword candidate in the invention. For instance, a key word specifying a place named "Shinjuku" is associated with "an image file showing a map of a central area of Shinjuku on a properly reduced scale", "a list of telephone numbers of Shinjuku-based business offices", "a schedule list containing an extraction of need-to-go-to-Shinjuku events from a own schedule table", and so on. A determination of which one among them is attached, is made from a past history and a context thereabout. For instance, in a case where the transmission mail has a phrase of "a meeting held at Shinjuku" and there was in the past a list of having attached the schedule list to a phrase of "a meeting held at . . . ", the schedule list among the candidates is attached, and so on.

As described above, in the embodiment also, the attachment file (the additional information) related to the transmission mail can be determined and automatically added in the same way as the above-mentioned. Accordingly, it is possible to effect the transmission by adding the necessary information even with less of inputs from the user, thereby facilitating the transmission of the electronic mail on a cellular phone and a mobile terminal such as a PDA, etc.

Embodiment 6

Figure 14:
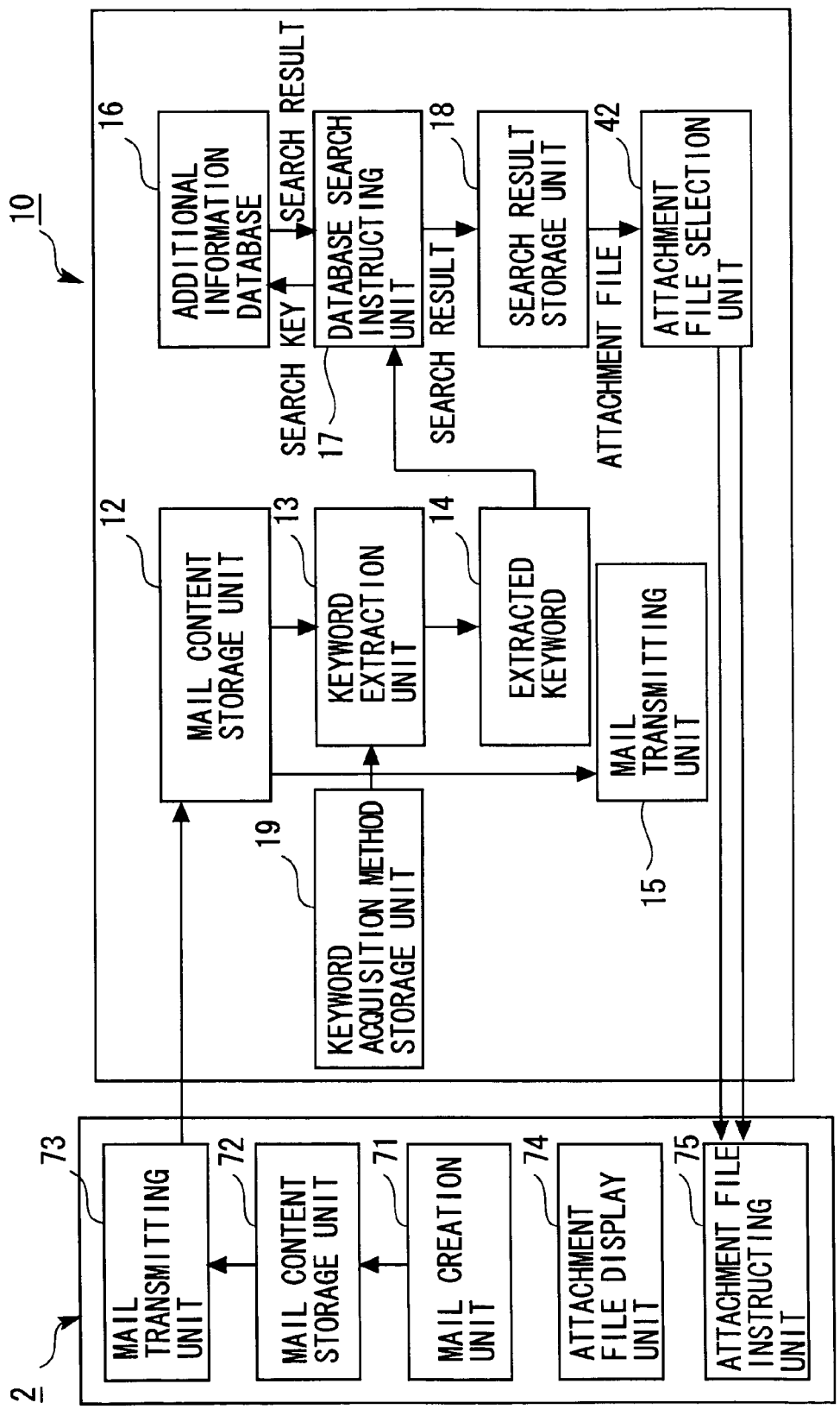
FIG. 14 is a block diagram of the electronic mail device in an embodiment 6.

FIG. 14 is a block diagram of an embodiment 6 according to the invention. As shown in the same Figure, an electronic mail device 10 in the embodiment, which is a so-called transmission mail server, receives the electronic mail from the terminal 2 and transmits this electronic mail to a computer as a transmitting destination. At this time, the mail server 10 is capable of solely transmitting the electronic mail received from the terminal 2 and also capable of transmitting it by attaching the additional information (the attachment file) as described above.

The mail server 10 in the embodiment includes a mail content storage unit (corresponding to a mail accepting unit) 12, a keyword extraction unit 13, an extracted keyword storage unit 14, a mail transmitting unit (corresponding to an adding unit) 15, an additional information database 16, a database search instructing unit (corresponding to a search unit) 17, a search result storage unit 18, an acquisition method storage unit 19, and an attachment file selection unit 42.

The mail content storage unit 12 receives (accepts) an input of an electronic mail created by a user and stores this mail.

The keyword extraction unit 13 extracts a keyword from the electronic mail stored on the mail content storage unit 12.

The extracted keyword storage unit 14 temporarily stores the keyword extracted by the keyword extraction unit 13.

The mail transmitting unit 15 adds additional information searched for by the database search instructing unit 17 to the electronic mail and transmits this mail.

The additional information database 16 is stored with images and candidates for the additional information of the mails, etc., which were processed (e.g., transmitted or received) in the past.

The database search instructing unit 17 searches the additional information database 16 for the additional information corresponding to the keyword extracted by the keyword extraction unit 13.

The search result storage unit 18 temporarily stores the additional information searched for by the database search instructing unit 17.

The acquisition method storage unit 19 is stored with a keyword acquisition method when extracting the keyword by the keyword extraction unit 13.

The attachment file selection unit 42 presents, to the terminal 2, pieces of additional information searched for by the database search instructing unit 17 to prompt the user to make a selection thereof, then accepts the selection by the user, and notifies the mail transmitting unit 15 of a piece of information indicating which additional information has been selected.

The mail server 10 may be a dedicated electronic appliance constructed of dedicatedly designed electronic circuits (hardware) as the respective units 12 through 19 and 42 described above, and may also be a device in which functions of the respective units 12 through 19 and 42 are softwarewise actualized by a general-purpose computer.

The mail server 10 in the embodiment is actualized by a general type of computer as shown in FIG. 2.

As shown in the same Figure, the mail server 10 includes, within a main body 61, an algebraic processing unit 62 constructed of a CPU (central processing unit), a main memory, etc., a storage device (hard disk) 63 stored with data and software for an algebraic process, an input/output (I/O) unit 64, and so on.

Connected properly to the I/O unit 64 are an input device such as a keyboard, a mouse, etc., an output device such as a display device, a printer, etc., and an interface for transmitting and receiving information with other appliances.

The storage device 63 is preinstalled with an operating system (OS) and application software (an information adding program for an electronic mail). Further, an interior of the storage device 63 is provided with the mail content storage unit (mail content storage area) 12, the acquisition method storage unit (acquisition method storage area) 19, and the additional information database 16.

The algebraic processing unit 62 executes the algebraic process based on the information adding program for the electronic mail, thereby functioning as the keyword extraction unit 13, the extracted keyword storage unit 14, the mail transmitting unit 15, the database search instructing unit 17, the search result storage unit 18, and the attachment file selection unit 42.

On the other hand, the terminal 2 includes, as illustrated in FIG. 14, a mail creation unit 71, a mail content storage unit 72, a mail transmitting unit 73, an attachment file display unit 74, and an attachment file instructing unit 75.

The mail creation unit 71 accepts the content inputted by the user in a way that manipulates the input button, thus creates the electronic mail structured of a mail text, a destination address, a title, a source address, etc., and stores the mail on the mail content storage unit 72.

The mail content storage unit 72 is stored with the mails created by the mail creation unit 71 and the mails transmitted and received.

The mail transmitting unit 73 transmits the electronic mail created by the mail creation unit 71.

The attachment file display unit displays candidates for the additional information searched for by the mail server 10.

The attachment file instructing unit notifies the mail server which additional information is actually attached.

§2. Information Adding Method for Electronic Mail

Figure 15:
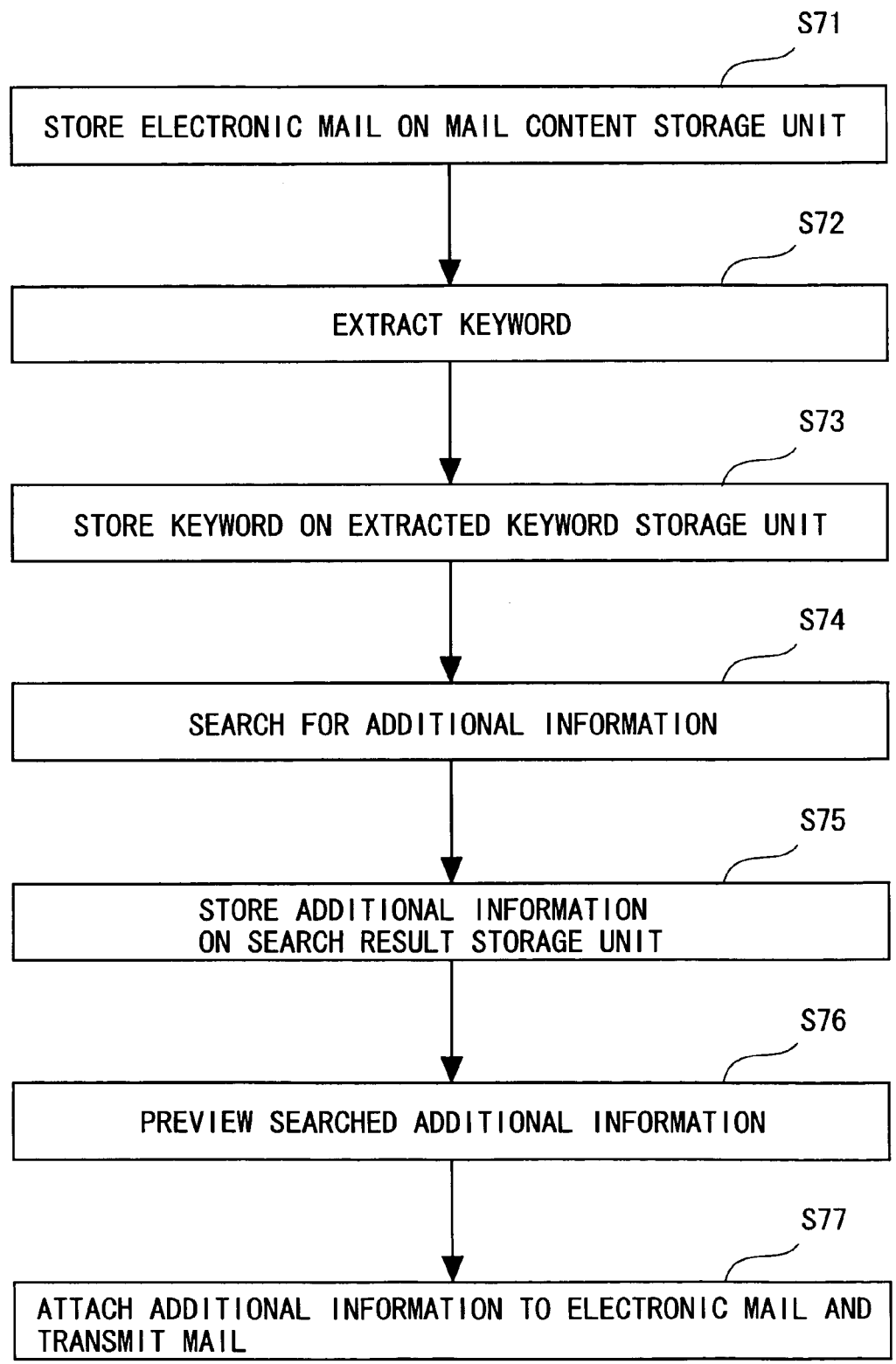
FIG. 15 is an explanatory diagram of the information adding method for the electronic mail in the embodiment 6.

Next, an electronic mail information adding method will be explained with reference to FIG. 15, by which the mail server 10 executes the electronic mail information adding program, then adds the additional information to the electronic mail and thus transmits this mail.

To start with, when the user inputs a content of transmission (a text to be transmitted) and a destination from by the input button on the terminal 2 and thus creates an electronic mail, the terminal 2 temporarily stores this electronic mail on the mail content storage unit 72, and transmits this mail to the mail server 10 through the mail transmitting unit 73.

The mail server 10 accepts an input of this electronic mail and stores the mail on the mail content storage unit 12 (S71).

Next, the keyword extraction unit 13 reads a keyword acquisition method by referring to the acquisition method storage unit 19, then extracts a keyword from the electronic mail in the mail content storage unit 12 on the basis of this acquisition method (S72), and temporarily stores the keyword on the extracted keyword storage unit (the main memory) 14 (S73).

The database search instructing unit 17 searches the additional information database 16 with respect to the extracted keyword, then searches for a coincident piece of additional information from within the candidates for the additional information stored on the additional information database 16 (S74), and temporarily stores the additional information on the search result storage unit (the main memory) 18 (S75).

Then, the attachment file selection unit 42, for having a selection made as to whether one or a plurality of attachment files searched for are actually attached or not, transmits the searched attachment file to the terminal 2 or has this attachment file previewed. A method for this previewing is that the file is transmitted in a way that reduces a data size as by a thumbnail image in the case of images and by decreasing a sampling grade in the case of voices for only first several seconds (S76).

When the user selects the attachment file by manipulating the input button on the terminal 2, the attachment file instructing unit 75 transmits information (selection information) indicating this selected attachment file to the mail server 10.

The attachment file selection unit 42 having received this piece of selection information notifies the mail transmitting unit 15 of this piece of selection information.

The mail transmitting unit 15 refers to the selection information, then adds the selected additional information to the electronic mail stored on the mail content storage unit 12, and transmits the mail to the transmitting destination (S77). At this time, the additional information is added as a MIME-formatted or otherwise-formatted attachment file. Note that the additional information may be, in the case of its being text data, added to a mail text. Further, the electronic mail is created in a language such as HTML, etc., and the keyword and the additional information may be linked to each other so that the attachment file is displayed or reproduced upon clicking the keyword contained in the mail text.

As described above, according to the embodiment, the keyword is extracted from the transmission mail, and the related information can be automatically added. Accordingly, it is possible to effect the transmission by adding the necessary information even with less of inputs from the user, thereby facilitating the transmission of the electronic mail on a small-sized terminal requiring a labor for inputting.

Moreover, in the embodiment, the extraction of the keyword and the search for the attachment file are conducted on the side of the mail server, whereby the transmission of the mail with the attachment file from on the terminal of which resources are extremely limited such as a cellular phone, a PHS, a PDA, etc., can be facilitated.

<Other Embodiments>

The invention is not limited to the illustrative examples given above and may have, as a matter of course, a variety of changes within the range that does not deviated from the gist of the invention.

As explained above, according to the invention, it is possible to provide the electronic mail device, the information adding program for the electronic mail and the information adding method for the electronic mail that are capable of saving, when sending the electronic mail, a labor for transmitting the mail by automatically adding the information related to the text that is to be transmitted.

What is claimed is:

1. An electronic mail device comprising:
   a mail accepting unit accepting an input of an electronic mail as a processing object;
   a keyword extraction unit obtaining a keyword from the electronic mail, wherein the keyword is at least one of:
      a character string delimited by the start point and the end point;
      information about an existing area of a sender or about a pre-registered recipient;
      a date and time recorded in relative time since a date and time of transmission, an absolute date and time obtained from the present date and time, or the present date and time; or
      a character string delimited by the start point and the end point, wherein one of:
         strings of words of titles of saved mail and the input electronic mail are perfectly coincident with each other;
         strings of words of titles of saved mail and the input electronic mail are coincident forwards; or
         a value given by (a number or words used in common throughout respective titles of saved mail)/(a total number of words) is obtained, and the value is equal to or greater than a predetermined value;
   a search unit searching for additional information corresponding to the keyword from an additional candidate storage unit stored with candidates for the additional information to the mail previously processed;
   an additional information selection unit accepting, in a case where the search unit has searched out plural pieces of additional information, a selection, from a list of the plural pieces of additional information, wherein the list has been sorted on a basis of a history of mails previously transmitted or received; and
   an adding unit adding the accepted selection to the electronic mail as a processing object, in the case where the search unit has searched out plural pieces of additional information.

2. The electronic mail device according to claim 1, wherein when receiving the electronic mail from a source terminal and transmitting the mail to a destination terminal, the additional information is added to the electronic mail.

3. A computer-readable storage storing an information adding program for an electronic mail, for making a computer execute a process comprising:
   accepting an input of an electronic mail as a processing object;
   obtaining a keyword from the electronic mail, wherein the keyword is at least one of:
      a character string delimited by the start point and the end point;
      information about an existing area of a sender or about a pre-registered recipient;
      a date and time recorded in relative time since a date and time of transmission, an absolute date and time obtained from the present date and time, or the present date and time; or
      a character string delimited by the start point and the end point, wherein one of:
         strings of words of titles of saved mail and the input electronic mail are perfectly coincident with each other;
         strings of words of titles of saved mail and the input electronic mail are coincident forwards; or
         a value given by (a number of words used in common throughout respective titles of saved mail)/(a total number of words) is obtained, and the value is equal to or greater than a predetermined value;
   searching for additional information corresponding to the keyword from an additional candidate storage unit stored with candidates for the additional information to the mail previously processed;
   accepting, in a case of having searched out plural pieces of additional information in the searching for the additional information, a selection, from a list of the plural pieces of additional information, wherein the list has been sorted on a basis of a history of mails previously transmitted or received; and
   adding the accepted selection to the electronic mail as the processing object in the case of having searched out plural pieces of additional information.

4. An information adding method for an electronic mail device, comprising:
   accepting an input of an electronic mail as a processing object;

obtaining a keyword from the electronic mail, wherein the keyword is at least one of:
  a character string delimited by the start point and the end point;
  information about an existing area of a sender or about a pre-registered recipient;
  a date and time recorded in relative time since a date and time of transmission, an absolute date and time obtained from the present date and time, or the present date and time; or
  a character string delimited by the start point and the end point, wherein one of:
    strings of words of titles of saved mail and the input electronic mail are perfectly coincident with each other;
    strings of words of titles of saved mail and the input electronic mail are coincident forwards; or
    a value given by (a number of words used in common throughout respective titles of saved mail)/(a total number of words) is obtained, and the value is equal to or greater than a predetermined value;
searching for additional information corresponding to the keyword from an additional candidate storage unit stored with candidates for the additional information to the mail processed in the past;
accepting, in a case of having searched out plural pieces of additional information in the searching for the additional information, a selection, from a list of the plural pieces of the additional information, wherein the list has been sorted on a basis of a history of mails previously transmitted or received; and
adding the accepted selection to the electronic mail as the processing object in the case of having searched out plural pieces of additional information.

* * * * *

UNITED STATES PATENT AND TRADEMARK OFFICE
CERTIFICATE OF CORRECTION

| | |
|---|---|
| PATENT NO. | : 7,444,322 B2 |
| APPLICATION NO. | : 10/802863 |
| DATED | : October 28, 2008 |
| INVENTOR(S) | : Takahiro Masuda et al. |

It is certified that error appears in the above-identified patent and that said Letters Patent is hereby corrected as shown below:

Column 16, Line 3, change "or" to --of--.

Column 16, Line 18, after "as" change "a" to --the--.

Column 16, Line 18, change "object," to --object--.

Signed and Sealed this

Sixth Day of January, 2009

JON W. DUDAS
*Director of the United States Patent and Trademark Office*